US009537540B2

(12) United States Patent
Graf

(10) Patent No.: US 9,537,540 B2
(45) Date of Patent: Jan. 3, 2017

(54) ROTARY TRANSMITTER FOR MACHINE TOOLS

(71) Applicant: KOMET GROUP GMBH, Besigheim (DE)

(72) Inventor: Heiko Graf, Woerth am Rhein (DE)

(73) Assignee: KOMET GROUP GMBH, Besigheim (DE)

( * ) Notice: Subject to any disclaimer, the term of this patent is extended or adjusted under 35 U.S.C. 154(b) by 0 days.

(21) Appl. No.: 15/195,012

(22) Filed: Jun. 28, 2016

(65) Prior Publication Data

US 2016/0308586 A1 Oct. 20, 2016

Related U.S. Application Data

(62) Division of application No. 14/922,884, filed on Oct. 26, 2015, now Pat. No. 9,413,433, which is a division
(Continued)

(30) Foreign Application Priority Data

Aug. 16, 2011 (DE) .................. 10 2011 080 973

(51) Int. Cl.
  *H04B 5/00* (2006.01)
  *H04B 15/02* (2006.01)
  (Continued)

(52) U.S. Cl.
  CPC ........... *H04B 5/0037* (2013.01); *B23Q 1/0009* (2013.01); *B23Q 5/043* (2013.01);
  (Continued)

(58) Field of Classification Search
  USPC ........................................ 455/41.1
  See application file for complete search history.

(56) References Cited

U.S. PATENT DOCUMENTS

| 2011/0038190 A1* | 2/2011 | Zimpfer | A61B 6/56 363/126 |
| 2011/0075796 A1* | 3/2011 | Loef | A61B 6/56 378/15 |

FOREIGN PATENT DOCUMENTS

| EP | 1 856 705 B1 | 11/2007 |
| WO | WO 2008/079870 A2 | 7/2008 |

OTHER PUBLICATIONS

International Search Report for PCT/EP2012/061970 (2 pgs.).
(Continued)

*Primary Examiner* — Ankur Jain
(74) *Attorney, Agent, or Firm* — Flynn, Thiel, Boutell & Tanis, P.C.

(57) ABSTRACT

The invention relates to a rotary transmitter (2) for machine tools, having an inductive energy transmission section (31), which is arranged between a stator part (4) fixed to the machine and a rotor part (6) fixed to the tool, and a contactless bidirectional data transmission section (35). A special feature of the invention consists in that, in order to make maximum use of the capacity of the energy transmission section (31), precautions are taken with which the optimal operating frequency ($f_{opt}$) of the energy transmission operating according to the transformer principle is determined at every system start in a test run with a connected test resister (51) and a variable frequency ($f_p$). Furthermore, for the purpose of interference-free data transmission, buffer storage of the data to be transmitted via the data transmission section (35) is proposed, which data are synchronized in predefined time windows with interference-free periods of the energy transmission.

2 Claims, 3 Drawing Sheets

Related U.S. Application Data of application No. 14/238,537, filed as application No. PCT/EP2012/061970 on Jun. 21, 2012, now Pat. No. 9,184,803.

(51) Int. Cl.
  *B23Q 1/00* (2006.01)
  *B23Q 5/04* (2006.01)
(52) U.S. Cl.
  CPC ............ *H02J 50/10* (2016.02); *H04B 5/0075* (2013.01); *H04B 15/02* (2013.01)

(56) References Cited

OTHER PUBLICATIONS

German Search Report from corresponding German Application No. 10 2011 080 973.2 (6 pgs.).
English translation of International Preliminary Report on Patentability and Written Opinion of the International Searching Authority issued Feb. 18, 2014 (14 pages).

\* cited by examiner

US 9,537,540 B2

ROTARY TRANSMITTER FOR MACHINE TOOLS

This is a divisional of prior U.S. application Ser. No. 14/922,884, filed Oct. 26, 2015, which is a divisional of U.S. application Ser. No. 14/238,537, which was the national stage of International Application No. PCT/EP2012/061970, filed Jun. 21, 2012.

FIELD OF THE INVENTION

The invention relates to a rotary transmitter for machine tools, having an inductive transmission section for electrical power, having a stator part, which is fixed to the machine, and a rotor part, which is fixed to the tool and can rotate about a rotation axis, wherein the stator part has a primary winding, which is arranged in a primary circuit, and the rotor part has a secondary winding, which is arranged in a secondary circuit and is separated from the primary winding by means of an air gap.

DESCRIPTION OF RELATED ART

Rotary transmitters of this kind are used, for example, in machine tools having adjustment tools (EP 1 856 705 B1). In the known rotary transmitters, a stator-end and a rotor-end power winding are in each case provided for inductive power transmission in accordance with the transformer principle. The power windings are separated from one another by in each case a stator-end and a rotor-end core part, wherein the stator-end and rotor-end core parts face one another across an air gap at mutually facing ends. In addition, stator- and rotor-end transmission and reception elements are provided in the known rotary transmitter, said stator- and rotor-end transmission and reception elements having stator- and rotor-end coupling turns, which are associated with one another in pairs, for inductive data transmission and being connected to a transmission and reception electronics system. An essential requirement of these rotary transmitters is that high electrical powers and large quantities of data can be transmitted given the lowest possible installation space. In addition, the systems should be robust and easy to handle since they have to operate in a reliable manner under harsh environmental and use conditions. Both in respect of production using components which are subject to tolerances and the partial mechanical manufacture of the coupling elements and also in respect of practical use, in which rotor, stator and actuation electronics systems have to be able to be replaced in the event of repair and maintenance, there are differences in the components, it being possible for these differences to influence both power and data transmission. In addition, owing to the physical proximity of power and data transmission elements, the compact design on offer exhibits the problem that power transmission can interfere with data transmission. Despite various structural measures for reducing this influence by means of shielding, symmetrization and interference-reduced circuit technology, this means that the transmission power, the reduction in installation space, the data rate, the flexibility and not least the system costs are subject to limits which restrict the field of application.

OBJECT OF THE INVENTION

Proceeding from this, the invention is based on the object of increasing the power which can be transmitted on the power transmission section, without interfering with data transmission in the process.

The combinations of features indicated in the patent claims are proposed for achieving this object. Advantageous refinements and developments of the invention can be found in the dependent claims.

SUMMARY OF THE INVENTION

The solution according to the invention is based on the knowledge that in order to transmit the electrical power from the stationary stator to the rotating rotor in accordance with the transformer principle said power has to be in the form of an alternating current or AC voltage. Since mains power is not suitable for direct transmission owing to the excessively low frequency (50 Hz) and the excessively high voltage (230 volts), a suitable alternating current has to be produced in the rotary transmitter itself. To this end, a power supply unit is used to provide a DC voltage which is converted by means of an inverter into an AC voltage with a suitable frequency. On the secondary side, the AC voltage is converted back into a DC voltage by means of a rectifier and a buffer capacitor. In addition, the contact-free transmission of power across an air gap in accordance with the transformer principle has the disadvantage that the degree of coupling between the primary winding and the secondary winding is considerably less than 1 and changes as the size of the air gap changes. In addition, the inductances of the primary and the secondary winding change as the air gap changes. In order to achieve optimum power output, the coupler has to be operated at a specific frequency close to the natural frequency of the secondary resonant circuit. Since said natural frequency changes as the size of the air gap changes and on account of the various component tolerances, the process cannot be based on a constant natural frequency. The invention therefore makes provision for the frequency to be newly determined and prespecified each time the system is started, with the result that the system can always be operated at an optimum operating frequency on the power transmission section even under changed conditions, such as a change in the tool head, a deviation in the air gap or an exchange of assemblies.

In order to achieve this, the invention proposes a procedure which comprises the following method steps each time the system is started:
- in a first step a test resistor is connected into the secondary circuit,
- in a second step a measure for the electrical load power in the primary circuit or in the secondary circuit is ascertained as a function of the alternating current frequency in the primary circuit,
- in a third step an optimum alternating current frequency in the primary circuit, at which frequency the electrical load power is at a maximum, is ascertained,
- in a fourth step an operating frequency of the alternating current for transmitting electrical power from the stator part to the rotor part is set in the primary circuit, the value of said operating frequency corresponding to the optimum alternating current frequency.

In respect of circuitry, the above object can be achieved
a) in that an inverter is arranged in the primary circuit, the DC input of said inverter being connected to a DC source, the AC output of said inverter being connected to a primary resonant circuit which contains the primary winding, and it being possible to vary and adjust the operating frequency of said inverter by means of a control assembly;
b) in that a rectifier is arranged in the secondary circuit, a secondary resonant circuit which contains the secondary winding being connected to the AC input of said rectifier, and the DC output of said rectifier being in the form of a load connection, wherein the secondary circuit comprises a test resistor which can be selectively connected and bridges the load connection.

c) In a first variant embodiment of the invention, an ammeter also is arranged in the primary circuit at the DC input of the inverter, while the control assembly has a programmable actuating output, which is connected to a frequency input of the inverter, and a measurement input which is connected to or communicates with the ammeter.

c') In a second variant embodiment of the invention, a voltmeter, which records the voltage drop across the test resistor, is arranged in the secondary circuit, while the control assembly has a programmable actuating output, which is connected to a frequency input of the inverter, and also a measurement input which communicates wirelessly with the voltmeter.

In order to arrive at the desired objective, according to a preferred refinement of the invention, the control assembly has an evaluation circuit or routine for storing and/or evaluating the measurement values, which are received by means of the measurement input in the form of measurement signals, as a function of the frequency values, which are output by means of the actuating output in the form of frequency signals, when the test resistor is connected, and also has a data memory for storing an optimum operating frequency which is calculated using the evaluation circuit or routine. In other words, this means that the control assembly sets the frequency of the alternating current, which is output by the inverter, to an optimum operating frequency which is close to the resonant frequency of the secondary resonant circuit.

A further preferred refinement of the invention makes provision for a respective transmission and reception element for contact-free bidirectional data transmission to be arranged in the stator part and in the rotor part. When the AC voltage for power transmission is inherently produced in an inverter in the manner of a square-wave voltage, relatively high-frequency interference signals, which can lead to interference in data transmission owing to the compact arrangement of power and data transmission sections in the rotary transmitter, occur primarily at the zero crossings. In order to avoid this, it is also proposed according to the invention a) that the data is transmitted by means of the bidirectional data transmission section in the form of data packets in time windows, b) that the information relating to the temporal position of the zero crossing of an alternating current in the power transmission section is ascertained, c) and that, on the basis of the information relating to the temporal position of the zero crossing of the alternating current in the primary circuit or in the secondary circuit of the power transmission section, the time windows for the transmission of the data packets are established such that the time windows lie between two successive zero crossings of the alternating current and each have a start and an end point which are at a time interval from the zero crossings of the alternating current.

In respect of circuitry, this can be realized according to the invention in that the stator-end and the rotor-end transmission element are connected to a respective control assembly which contains a buffer memory in which data packets for transfer to the associated rotor-end or stator-end reception element in a defined time window are stored, wherein the length of the time window is smaller than half the period of the alternating current which flows through the primary winding in the primary circuit and/or the secondary winding in the secondary circuit, and wherein the start and the end of the time window are at a time interval from the successive zero crossings of the alternating current which flows through the primary winding and/or the secondary winding.

BRIEF DESCRIPTION OF THE DRAWINGS

The invention will be explained in greater detail below with reference to the exemplary embodiments which are schematically illustrated in the drawing, in which.

DETAILED DESCRIPTION OF THE INVENTION

Figure 1:
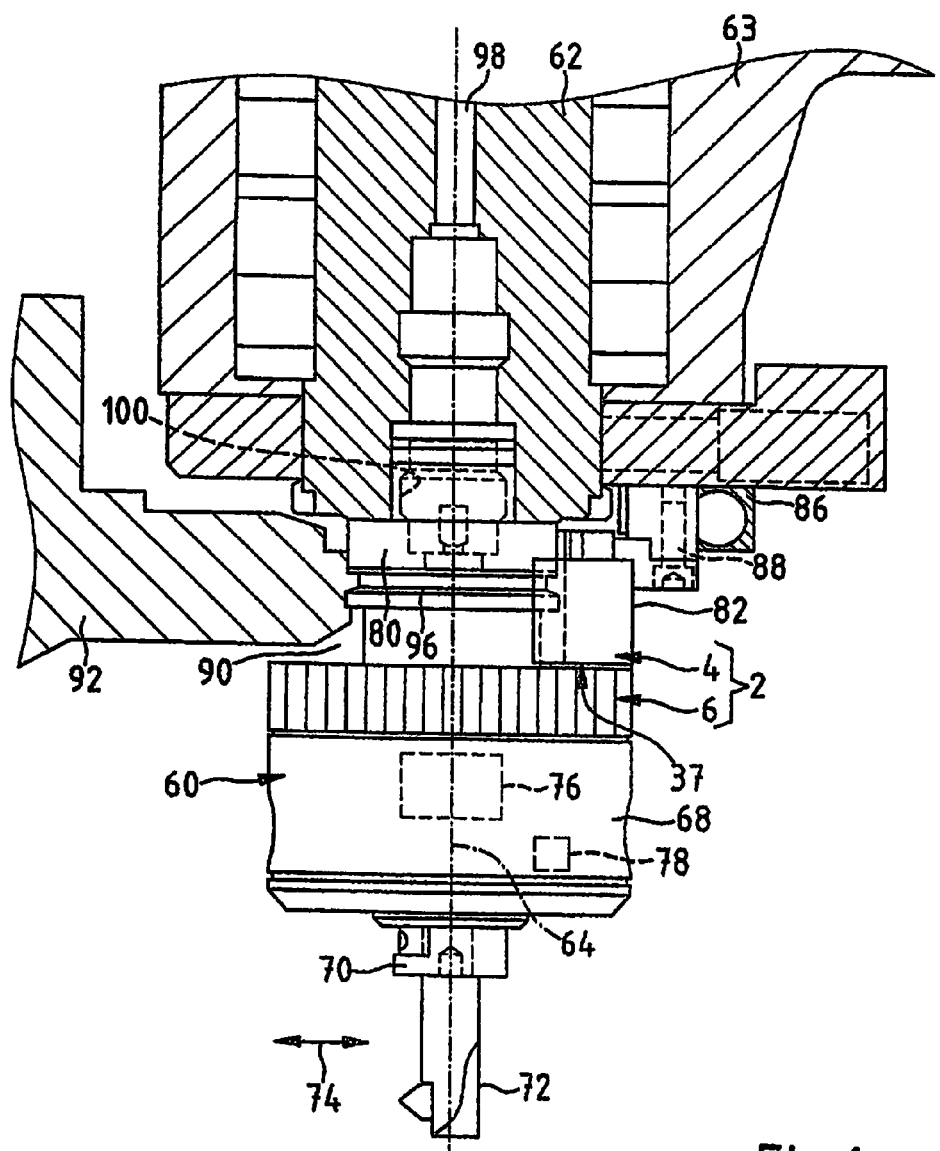
FIG. 1 shows a partially sectioned illustration of a side view of a tool head, which is clamped into a machine spindle, with a rotary transmitter for power and data transmission.
Figure 2:
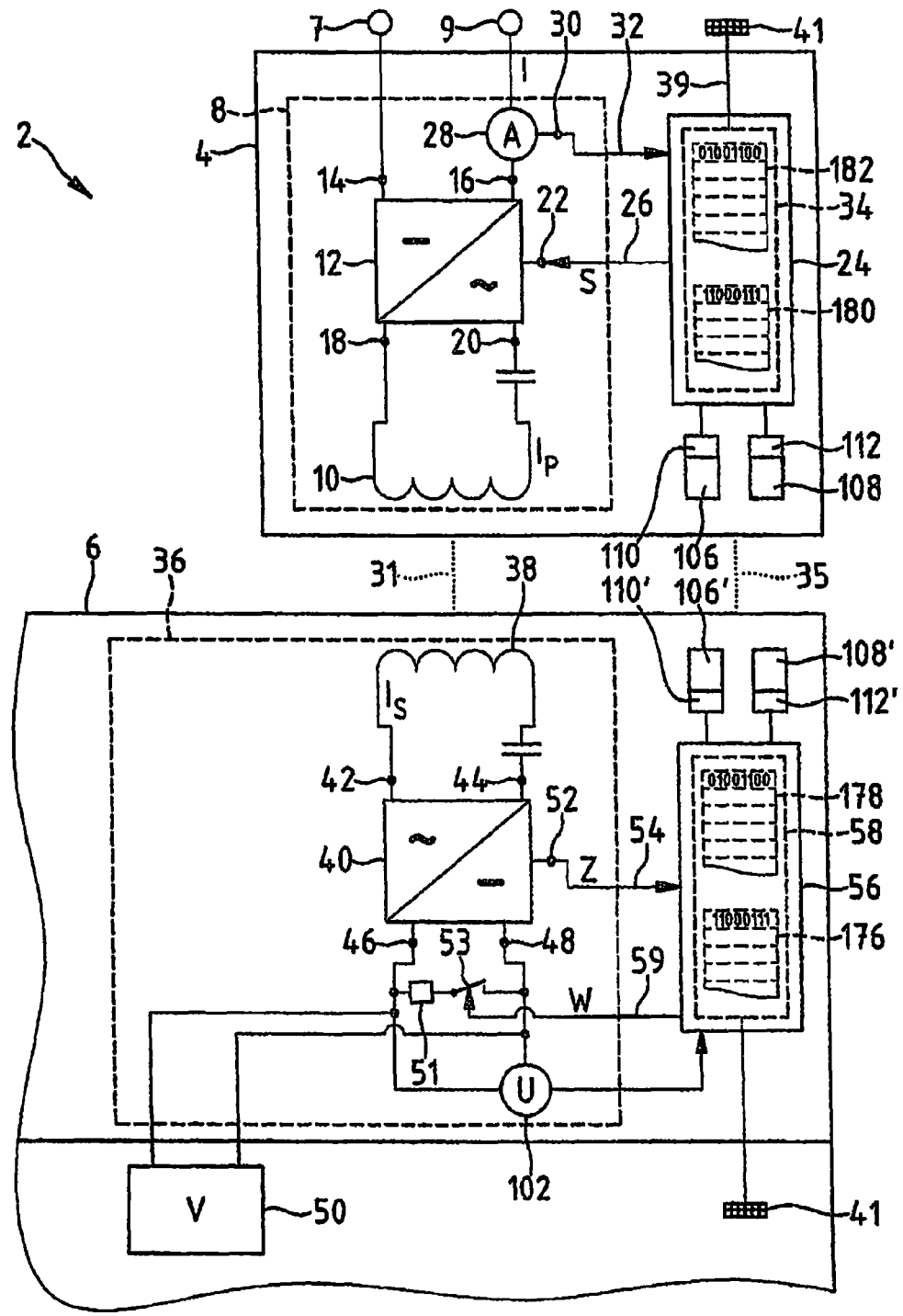
FIG. 2 shows a circuit diagram of the rotary transmitter with a stator-end primary circuit and a rotor-end secondary circuit.

The rotary transmitter illustrated in FIG. 2 is intended to be used in the region of a replaceable tool head of a machine tool, as illustrated by way of example in FIG. 1. The tool head 60, which is shown in FIG. 1 and is in the form of a precision turning head, substantially comprises a main body 68, a slide 70 which can be adjusted transversely in the direction of the arrow 74 in relation to the rotation axis 64 of the tool head 60 and has a cutting tool 72, at least one electrical load 50 which is arranged within the tool head 60, for example in the form of a measuring device 78 for direct adjustment movement measurement, and an electric adjusting motor 76 for the slide 70. Power is supplied for the electrical load 50 and the data interchange by means of the rotary transmitter 2 which comprises a stator part 4 and a rotor part 6. The tool head 60 can be coupled to the machine spindle 62 of a machine tool 63 by way of a tool shank 80 which projects axially beyond the main body. In order to set an air gap 37 between the stator part 4 and the rotor part 6, the stator housing 82 is arranged on a holder 86, which is fixed to the stator, by means of an adjustment mechanism 88 such that both its distance from the rotor and its rotary position about an axis which is parallel in relation to the rotation axis 64 can be adjusted. In the exemplary embodiment shown in FIG. 1, the stator part 4 extends in the manner of a segment only over a portion of the circumference of approximately 60° to 100° of the tool shank 80 and leaves the majority of the shank circumference free, so as to form a free space 90 for access by a tool gripper 92 for automatic tool changing. When the tool is changed, the tool head 60 is grasped at the gripper groove 96 by the tool gripper 92 from that side which is opposite the stator part 4, and is moved axially with respect to the machine spindle 62 when the tool coupling is released. The tool head 60 is coupled to the machine spindle 62 by means of a clamping mechanism which can be operated on the machine side by means of a tie rod 98, engages from the machine side into the hollow space 100 in the tool shank 80, and couples the tool head 60 to the machine spindle 62 so as to produce planar surface clamping and radial clamping.

As shown in FIG. 2, the rotary transmitter 2 has an inductive power transmission section 31 which comprises the stator part 4, which is fixed to the machine and has already been described in connection with FIG. 1, and the rotor part 6, which is fixed to the tool and can rotate about a rotation axis 64. The stator part 4 has a primary winding 10, which is arranged in a primary circuit 8, and the rotor part 6 has a secondary winding 38, which is arranged in a secondary circuit 36 and is separated from the primary winding 10 by means of the air gap 37.

An inverter 12 is arranged in the primary circuit 8, the DC input 14, 16 of said inverter being connected to a DC source 7, 9, and the AC output 18, 20 of said inverter being connected to a primary resonant circuit which contains the primary winding 10. The operating frequency of the inverter 12 can be set by means of a stator-end control assembly 24. A rectifier 40 is located in the rotor-end secondary circuit 36, a secondary resonant circuit which contains the secondary winding 38 being connected to the AC input 42, 44 of said rectifier, and the DC output 46, 48 of said rectifier being in the form of a connection for the rotor-end electrical load 50.

A data transmission section 35 is also located between the stator part 4 and the rotor part 6, said stator part and rotor part having a respective transmission and reception element 106, 108 and, respectively, 106', 108' for contact-free bidirectional data transmission, said transmission and reception elements each having a transmission and reception electronics system 110, 112 and, respectively, 110', 112'. The transmission and reception elements are actuated by means of the stator-end control assembly 24 or the rotor-end control assembly 56. The transmission and reception elements are expediently constituent parts of an inductive, capacitive or optical data transmission section.

Contact-free power transmission across the air gap 37 in accordance with the transformer principle has the advantage that the degree of coupling between the stator-end primary winding 10 and the rotor-end secondary winding 38 is considerably less than 1 and changes as the size of the air gap 37 changes. In addition, the inductances of the primary and the secondary winding 10, 38 change as the size of the air gap 37 changes. In order to achieve optimum power transmission, the primary circuit 8 and the secondary circuit 36 have to be operated at an optimum frequency which corresponds approximately to the natural frequency of the secondary circuit. Since the natural frequency changes as the size of the air gap changes and the tolerances of various components in the stator and rotor part 4, 6 change, the operating frequency has to be adjusted each time the system is started.

To this end, the secondary circuit 36 has a test resistor 51 which can be selectively connected by means of the switch 53 and bridges the DC output 46, 48 in the region of the load connection. In addition, according to a first variant embodiment, an ammeter 28 is arranged in the primary circuit at the DC input 14, 16 of the inverter 12, the output 30 of said ammeter communicating with a measurement input 32 of the stator-end control assembly 24. As an alternative to this, according to a second variant embodiment, a voltmeter 102, which records the voltage drop across the test resistor 51, is arranged in the secondary circuit, the output of said voltmeter communicating with a measurement input 39 of the stator-end control assembly 24, for example, by means of a data transmission section 41.

In both variant embodiments, the stator-end control assembly 24 has a programmable actuating output 26 which is connected to the frequency input 22 of the inverter 12. For its part, the control assembly 24 has an evaluation circuit or routine for storing and/or evaluating the measurement values from the ammeter 28 or from the voltmeter 102, which measurement values are received by means of the measurement input 32 and, respectively, 39 in the form of measurement signals, as a function of the frequency values $f_p$, which are output by means of the actuating output 26 in the form of frequency signals S, when the test resistor 51 is connected, and also has a data memory for storing an optimum operating frequency $f_{opt}$ which is calculated by way of the evaluation circuit or routine. This circuit arrangement operates as follows:

once the rotary transmitter 2 is activated, the stator-end control assembly 24 prespecifies a fixed alternating frequency, which is roughly in the range of the later operating frequency, to the inverter 12 for a short time. In the process, power is transmitted from the stator end to the rotor end, it being possible for the rotor-end control assembly 56 to begin to operate using said power. Said control assembly first connects the test resistor 51 by means of the output 59 and the switch 53, said test resistor receiving the transmitted power by means of the DC output 46, 48 of the rectifier 40 and therefore providing the secondary resonant circuit with a low impedance for the natural frequency, that is to say providing it with a certain quality.

Figure 3:
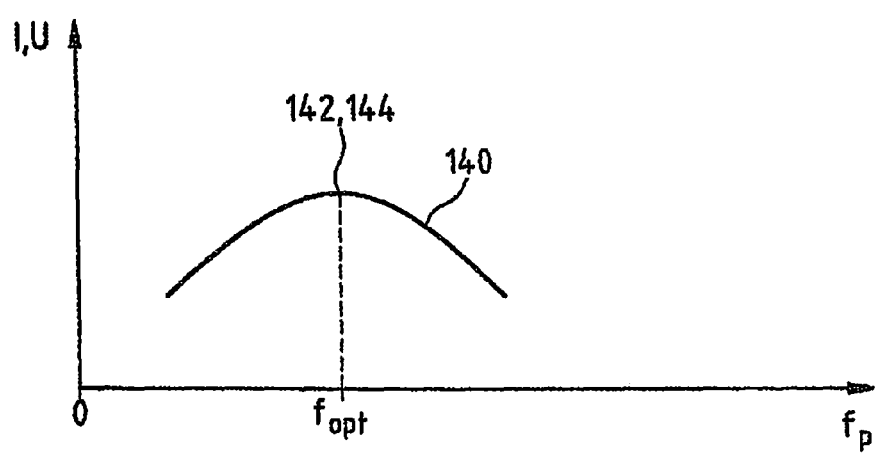
FIG. 3 shows an optimization diagram for determining the optimum operating frequency of the power transmission section.

Subsequently, the stator-end control assembly 24 begins to run through a prespecified frequency range in steps. In the process, at each frequency step, either the current consumption I of the inverter 12 is measured by means of the ammeter 28 or the voltage drop U across the test resistor 51 is measured by means of the voltmeter 102 and stored with the associated frequency values $f_p$ so as to form a curve 140 (FIG. 3). If the natural frequency of the rotor-end secondary resonant circuit is now within the frequency range which has been run through, it is possible to establish either a current maximum 142 or a voltage maximum 144 in that range (cf. FIG. 3).

The evaluation circuit or routine which is present in the stator-end control assembly 24 now determines the frequency belonging to the current maximum 142 or voltage maximum 144, possibly further adjusts said frequency with a correction value and stores it as the optimum operating frequency $f_{opt}$ in a data memory for the subsequent actuation of the inverter 12. The test resistor 51 is then disconnected by means of the switch 53, with the result that the total power which can be transmitted is now available to the electrical load 50.

As already explained above, both an inductive power transmission section 31 and a contact-free bidirectional data transmission section 35 are provided between the stator part 4 and the rotor part 6 of the rotary transmitter 2. The AC voltage for the power transmission is inherently produced in the inverter 12, which is connected to a DC source, in the manner of a square-wave voltage. When the DC voltage is chopped into the AC voltage, relatively high-frequency interference occurs primarily at the zero crossings, but this interference quickly dissipates. At a time interval from each zero crossing, there is a relatively long time period until the next zero crossing in which there is no interference. Secondly, the data does not have to be continuously transmitted by means of the data transmission section 35 when there is a sufficiently high bit rate. According to the invention, this can be used for the purpose of transmitting the data in time windows with interposed transmission breaks by means of the bidirectional data transmission section 35 in the form of data packets 180, 182, 176, 178. In order to ensure interference-free transmission, the information relating to the temporal position of the zero crossing of the alternating current in the power transmission section is first ascertained. On the basis of the information relating to the temporal position of the zero crossing of the alternating current of the power transmission section, the time windows for the transmission of the data packets 180, 182, 176, 178 are established such that they are between two successive zero crossings of the alternating current, and that they each have a start and an end point which are at a time interval from the zero crossings of the alternating current.

In respect of circuitry, this is realized according to FIG. 2 in that the stator-end and the rotor-end transmission element are connected to a respective control assembly 24, 56 which contains a respective buffer memory 34, 58 in which data packets 180, 182 and, respectively, 176, 178 for transmission by means of the associated rotor-end or stator-end transmission elements 106, 106' in a defined time window are stored. In this case, the data packets 180, 182, 176, 178 are dimensioned such that the length of the associated time window is smaller than half the period of the alternating current which flows through the primary winding 10 in the primary circuit 8 and/or the secondary winding 38 in the secondary circuit 36, and wherein the start and the end of the time window are at a time interval from the successive zero crossings of the alternating current which flows through the primary winding 10 and/or the secondary winding 38. Data transmission which is not adversely affected by changeover interference in the power transmission section is achieved by way of this measure, despite the compact design of the rotary transmitter 2.

In summary, the following can be stated: the invention relates to a rotary transmitter 2 for machine tools, having an inductive power transmission section 31, which is arranged between a stator part 4, which is fixed to the machine, and a rotor part 6, which is fixed to the tool, and also having a contact-free bidirectional data transmission section 35. A special feature of the invention is that precautions are taken for the purpose of utilizing the capacity of the power transmission section 31 to the maximum extent, whereby the optimum operating frequency $f_{opt}$ of the power transmission process, which operates in accordance with the transformer principle, is ascertained in a test run with the test resistor 51 connected and at the variable frequency $f_p$ each time the system is started. Furthermore, for the purpose of interference-free data transmission, it is proposed that the data which is to be transmitted by means of the data transmission section 35 is temporarily stored, this temporary storage being synchronized in prespecified time windows with interference-free time periods of power transmission.

LIST OF REFERENCE SYMBOLS

2 Rotary transmitter
4 Stator part
6 Rotor part
7, 9 DC source
8 Primary circuit
10 Primary winding
12 Inverter
14 Slide
14, 16 DC input
18, 20 AC output
22 Frequency input
24 Stator-end control assembly
26 Actuating output
28 Ammeter
30 Output
31 Power transmission section
32 Measurement input (I)
34 Buffer memory, data memory
35 Data transmission section
36 Secondary circuit
37 Air gap
38 Secondary winding
39 Measurement input (U)
40 Rectifier
41 Data transmission section
42, 44 AC input
46, 48 DC output
50 Electrical load
51 Test resistor
53 Switch
56 Rotor-end control assembly
58 Buffer memory
59 Output
60 Tool head
62 Machine spindle
63 Machine tool
64 Rotation axis, rotary axis
68 Main body
70 Slide
72 Cutting tool
74 Arrow
76 Electrical adjusting motor
78 Measuring device
80 Tool shank
82 Stator housing
  Holder which is fixed to the stator
88 Adjustment mechanism
90 Clearance
92 Tool gripper
96 Gripper groove
98 Tie rod
100 Hollow space
102 Voltmeter
106, 108 Transmission and reception element (stator-end)
106', 108' Transmission and reception element (rotor-end)
110, 112 Transmission and reception electronics (stator-end)
110', 112' Transmission and reception electronics (rotor-end)
140 Curve
142 Current maximum
144 Voltage maximum
176, 178, 180, 182 Data packet
I Current
U Voltage
$f_p$ Frequency
$f_{opt}$ Optimum operating frequency

What is claimed is:

1. A method for inductive transmission of electrical power by a rotary transmitter for machine tools from a stator part which is fixed to a machine and has a primary circuit, to a rotor part which is fixed to a tool and has a secondary circuit, comprising the steps of: connecting a test resistor into the secondary circuit; ascertaining a measure for an electrical load in the primary circuit or the secondary circuit as a function of a frequency fp of an alternating circuit in the primary circuit; ascertaining an optimum frequency $fo_pt$ of an alternating current in the primary circuit at which an electrical load power is at a maximum; and setting an operating frequency of the alternating current in the primary circuit for transmitting electrical power from the stator part to the rotor part, a value of the operating frequency corresponding to the optimum frequency $fo_{pt}$.

2. A method for transmitting data in a form of data packets in time windows over a data transmission section by a contact-free rotary transmitter having an inductive power transmission section, comprising the steps of: ascertaining information relating to a temporal position of a zero crossing of an alternating current in the power transmission section and, on a basis of the information relating to the temporal position of the zero crossing of the alternating current in a primary circuit or in a secondary circuit of the power transmission section, establishing the time windows for the transmission of the data packets such that the time windows lie between two successive zero crossings of the alternating current and each have a start and an end point which are at a time interval from the zero crossings of the alternating current.

* * * * *